Patented Sept. 14, 1954

2,689,184

UNITED STATES PATENT OFFICE 2,689,184

WALLPAPER PASTE

Frank X. Grossi, St. Louis County, Mo., assignor to The Reardon Company, St. Louis, Mo., a corporation of Missouri No Drawing. Application June 4, 1952,
Serial No. 291,780

6 Claims. (Cl. 106—14)

This invention relates to wallpaper paste and more particularly to adhesive base which may be mixed with water to form a paste suitable for hanging wallpaper.

Heretofore, wallpaper paste has principally comprised starch, and as such has suffered from such defects as susceptibility to spoilage when in aqueous solution, vulnerability to hydrolytic agents and micro-organisms, and attractiveness to vermin and insects, unless treated with liberal doses of antiseptics and preservatives which, although effective, pose a hazard of toxicity. Other objectionable features include a tendency to stain, which stains are not readily removed by a water wash; insolubilization of starch on freezing or drying; and lack of homogeneity of dispersions of starch in water solution.

The use of the methyl ether of cellulose as an adhesive has been proposed, but this material is entirely too expensive for practical consideration as a wallpaper paste base. Moreover, this material, whether in the form of dry powder, damp crumbs, or a thick gel, tends to become lumpy when water is added so that, with the crude mixing equipment available to the usual paper hanger, it is not reasonable to expect the resultant paste to have that uniformity of consistency and homogeneity considered indispensable by the plyers of the trade.

Recently it has been proposed to overcome some of the limitations of starch-base pastes by the use of sodium carboxymethyl cellulose. Although such a paste represents an improvement over paste based essentially upon starch, it has not been entirely satisfactory. For example, sodium carboxymethyl cellulose is sensitive to and reactive with a number of chemicals, including lime, which may be present in plaster walls, acidic sizings in the paper, such as alum, zinc chloride and zinc sulfate. When reacted with these chemicals, sodium carboxymethyl cellulose is readily precipitated and rendered useless. It is accordingly an object of this invention to provide for a wallpaper paste that does not have these defects.

It is a further object of this invention to provide a paste of the above character having improved flexibility and reduced sensitivity to the high humidities and in general a stronger bond between the wallpaper and the supporting surface.

A further object of the invention is to provide an adhesive composition having a reduced surface tension permitting better penetration than cellulose-based pastes heretofore suggested.

An additional object of the invention is to provide an adhesive composition of the above character, which is compatible with a wide range of such adhesives as casein, starch, dextrin and glue, and which is not subject to precipitation when added to mixtures of the above binders or applied to wall surfaces and wallpaper.

Still another objective of the invention is to provide for a wallpaper paste having an improved capacity to slip, thereby to facilitate the fitting of a strip of wallpaper on a wall with respect to an adjacent strip previously applied.

In pursuing these objectives, I discovered that substantial quantities of salt (NaCl), when added to, and thoroughly intermixed dry with, the intermediate viscosity grade (1500 to 3000 centipoises in two percent aqueous solution at 20° C.) of methyl cellulose powder on the market, resulted in a base which could easily be incorporated with water to produce a wallpaper paste having quite desirable properties, except for the cost of the methyl cellulose required. My investigation then revealed that according to one process of manufacturing methyl cellulose, there is an intermediate stage whereat methyl cellulose is co-precipitated with sodium chloride in the proportions of 10 or 11 parts by weight of the former to 7 or 8 of the latter. This co-precipitated material, which theretofore had no practical use except as a crude from which to recover the purified methyl cellulose, resulted from the following reaction (shown for one anhydroglucose unit in the cellulose chain):

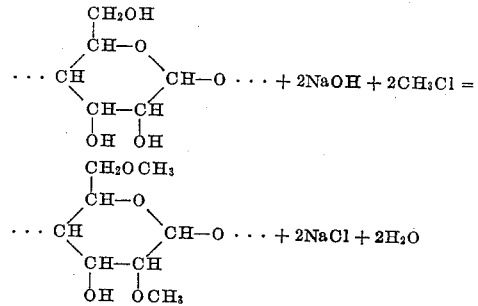

This co-precipitated material, not having been subjected to the costly purification processes, is not only suited for use as a wallpaper paste base by its physical properties, but is markedly cheaper than the purified methyl cellulose. While the foregoing structural formula indicates the type of methyl cellulose (viscosity 1500–4000 centipoises) contemplated by this invention, it is realized that some anhydroglucose units may undergo less, and others more, methyl substitution than indicated—but so long as the average approximates substitution at two of the three hydroxyl groups in each anhydroglucose unit, the material is suitable. On the other hand, similar materials, wherein the methyl substitution has occurred on the average in only one or all three of the hydroxyls, are not so well suited for wallpaper paste purposes because the so-called high viscosity grade (above 6000 centipoises) of methyl cellulose, when thinned to paper hangers' consistency, does not have satisfactory adhesion, and the so-called low viscosity grade (circa 500 centipoises) requires such quantity to produce the desired consistency that it is not economically feasible at this time.

The sodium chloride inhibits the formation of agglomerates or lumps of the fibers of methyl cellulose and facilitates separation of the fiber layers into discrete particles, thereby accelerating their solution in water. The sodium chloride also reduces the susceptibility of the methyl cellulose to bacterial degradation and results in a lower freezing point for water solutions thereof.

The methyl cellulose-sodium mixture is intended to be dissolved and extended by the addition of water so as to form the ultimate wallpaper paste of consistency to suit the paper hanger, which consistency, though fairly standard, is subject to some variation to suit the feel of the particular paper hanger. Unless care be taken to guard against the use of metal vessels and metal tools in the mixing and application of the paste, the high percentage of sodium chloride present may corrode the vessels or tools, with the result that rust spots become entrained in the ultimate paste. While such rust spots do no damage on the concealed side of the wallpaper, accidental spilling or splattering of an increment of paste upon the exposed side of the wallpaper may permanently stain the latter. Accordingly, the present invention contemplates that the wallpaper paste-base consisting essentially of the methyl cellulose and the sodium chloride include also a corrosion inhibitor in character and amount sufficient to neutralize the corrosive effect of the sodium chloride, at least for the time period which elapses between the beginning of the mixing operation and its final application. Suitable corrosion inhibitors for the purpose are disodium hydrogen phosphate ($Na_2HPO_4$), soda ash, borax, and a variety of others well known to those skilled in the art of a corrosion inhibition, and which are compatible with the other components of the paste-base. When the paste base contains such a corrosion inhibitor, no particular care need be exercised in the choice of vessels or tools in and with which the paste is handled.

In order to assure uniform anchorage of the wallpaper to the wall, under the great variety of conditions which may be encountered in the field, it is desirable to incorporate in the paste-base a small quantity of a wetting agent having the capacity of reducing the surface tension of the paste at the paper- and at the plaster-interfaces. When the wetting agent is in dry powder form (such as a substituted aromatic sulfonic acid salt of the type sodium ($C_{10}$–$C_{16}$ alkyl) benzene sulfonate, known as "Santomerse S"; the sodium salt of the sulfonic acid derivative of lauryl alcohol, known as "Duponol ME"; ammonium laurate; and other wetting agents having comparable surface-action properties) the paste-base may be distributed either as a powder or as a semi-solid. Indeed, liquid wetting agents having comparable physical properties may be employed when the paste-base is distributed as a semi-solid, or even when distributed as a powder provided the amount employed is sorbable by the solid components of the paste-base.

The co-precipitated methyl cellulose and salt in common with pure methyl cellulose has the proclivity to foam when mixed with water. This proclivity is accentuated when a wetting agent is present. Consequently, it is desirable to include a defoaming agent either in the paste-base composition or in the ultimate solution at the time of mixing with water. While any one of a great variety of defoaming agents may be employed, it is preferred to use about one part of pine oil to each fifty parts of methyl cellulose in the co-precipitated product. Even where the paste-base is distributed in dry powder form, such a quantity of pine oil is readily carried by the powder without becoming lumpy or non-free flowing. Pine oil has the additional advantage of acting as a mild antiseptic and further protecting the methyl cellulose against bacterial degradation. Other defoamers besides pine oil which have proved to be helpful are: octyl alcohol, diethylene glycol monolaurate, tri-n-butyl phosphate, and lauryl alcohol.

Unless the paste base is kept in storage for an unexpectedly long period of time before use, it is unnecessary to incorporate any additional preservative, but preservative such as sodium pentachlor phenate, or sodium orthophenyl phenate may, if desired, be included in the paste-base composition, thereby prolonging its shelf life.

The following specific examples illustrate several embodiments of the invention. In each example, the methyl cellulose contemplated has a viscosity in the range from 1500 to 3000 centipoises in a two per cent aqueous solution at 20° C.

*Example 1*

As a dry powder paste-base adapted to be dissolved and extended by addition of water in amount to provide about four gallons of paste for each pound of the dry paste-base; the composition consists of the co-precipitated product above-mentioned containing 50 to 55 parts by weight of methyl cellulose, 35 to 40 parts by weight of sodium chloride, and 10 parts by weight of water. This example is recommended only when care is taken that no corrodible metal vessels or tools be used in its mixture or application.

*Example 2*

As a dry powder paste-base suitable for use without regard to the character of vessels or tools with which it is mixed or applied: add and thoroughly intermix with the composition of Example 1, 1 part of disodium hydrogen phosphate (or an equivalent amount of other compatible corrosion inhibitor) to each 10 parts of salt present.

*Example 3*

A dry powder paste-base having universal applicability and adapted to make up into about four gallons of paste per pound of paste-base is as follows:

50 parts by weight of methyl celulose
35 parts by weight of NaCl
110 parts by weight of water
3 parts by weight of $Na_2HPO_4$
1 part by weight of Santomerse S
1 part by weight of pine oil

Example 4

As a semi-solid paste-base, the material of either of the preceding examples is incorporated with an equal weight of water and thoroughly colloided. A pound of this paste-base will make up about two gallons of paste according to the consistency desired by the paper hanger and which is usually determined by feel.

Example 5

As an example of a paste ready for application, dissolve the composition of Example 1, 2, or 3 in four gallons of water with stirring until the mixture is clear, homogeneous, and "water-white." More or less than four gallons of water may be used to achieve the consistency which best suits the feel of the particular paper hanger.

Other examples may involve the substitution of the defoaming agent, the wetting agent, or the corrosion inhibitor by an equivalent as hereinbefore suggested.

The wallpaper paste herein disclosed has the advantages of drying to a tough but highly flexible adhesive film, and is unaffected by the ingredients of plaster, wood, or metal walls, or by the ingredients of paper and paper sizings. Also, the films formed by the paste are impervious to greases, waxes and oils, thereby serving to protect the paper, yet any spots of paste, accidentally deposited upon the exposed surface of the wallpaper, do not mar its appearance, because the paste dries transparent. However, any such spots may readily be removed by water without staining the paper.

From the foregoing description, it is apparent that those skilled in the art will understand the composition of the invention herein disclosed, and appreciate the advantages thereof. Although several examples have been disclosed in detail, it is to be understood that the invention is not limited thereto, but the description thereof is to be understood as being merely illustrative. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. A wallpaper paste-base consisting essentially of methyl cellulose, and sodium chloride in the proportions of 10 to 11 parts of methyl cellulose to 7 to 8 parts of sodium chloride.

2. The wallpaper paste-base of claim 1 containing a relatively small amount of corrosion inhibitor.

3. The wallpaper paste-base of claim 1 containing a wetting agent.

4. A composition adapted for forming wallpaper paste merely by the addition of water, comprising methyl cellulose, sodium chloride, water, a corrosion inhibitor, and pine oil in proportions of approximately 50 parts by weight of methyl cellulose, 35 parts by weight of sodium chloride, 3 parts by weight of corrosion inhibitor, and 1 part by weight of pine oil.

5. A wallpaper paste-base comprising:

50 parts by weight of methyl cellulose
35 parts by weight of NaCl
110 parts by weight of water
3 parts by weight of $Na_2HPO_4$
1 part by weight of Santomerse S
1 part by weight of pine oil
---
200

6. A wallpaper paste comprising a water solution of methyl cellulose having a viscosity of 1500 to 3000 centipoises, sodium chloride, disodium hydrogen phosphate, and pine oil in proportions of approximately 50 parts by weight of methyl cellulose, 35 parts by weight of sodium chloride, 10 parts by weight of water, 3 parts by weight of disodium hydrogen phosphate and 1 part by weight of pine oil.

References Cited in the file of this patent

UNITED STATES PATENTS

| Number | Name | Date |
|---|---|---|
| 1,329,386 | Einhardt | Feb. 3, 1920 |
| 2,008,641 | Gilbert | July 16, 1935 |
| 2,350,161 | Gloor | May 30, 1944 |
| 2,424,050 | Pecker et al. | July 15, 1947 |
| 2,486,216 | Silvernail et al. | Oct. 25, 1949 |

OTHER REFERENCES

"Methocel," Dow Chem. Co., Midland, Mich., 1948, page 53.